US010445772B1

(12) United States Patent
Chau

(10) Patent No.: US 10,445,772 B1
(45) Date of Patent: *Oct. 15, 2019

(54) LABEL PLACEMENT BASED ON OBJECTS IN PHOTOGRAPHIC IMAGES

(71) Applicant: Google LLC, Mountain View, CA (US)

(72) Inventor: Stephen Chau, Stanford, CA (US)

(73) Assignee: Google LLC, Mountain View, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 15/457,387

(22) Filed: Mar. 13, 2017

Related U.S. Application Data

(63) Continuation of application No. 14/270,614, filed on May 6, 2014, now abandoned, which is a continuation of application No. 13/229,341, filed on Sep. 9, 2011, now Pat. No. 8,751,301.

(51) Int. Cl.
| | | |
|---|---|---|
| *G06Q 30/00* | (2012.01) | |
| *G06Q 30/02* | (2012.01) | |
| *G06T 7/33* | (2017.01) | |

(52) U.S. Cl.
CPC ......... *G06Q 30/0251* (2013.01); *G06T 7/337* (2017.01); *G06T 2207/20124* (2013.01); *G06T 2207/20212* (2013.01); *G06T 2207/30* (2013.01)

(58) Field of Classification Search
CPC ... G06Q 30/00; G06T 7/337; G06T 2207/337; G06T 2207/20124; G06T 2207/20212
See application file for complete search history.

(56) References Cited

U.S. PATENT DOCUMENTS

| | | |
|---|---|---|
| 6,408,302 B1 | 6/2002 | Lee et al. |
| 7,414,637 B2 | 8/2008 | Fogel et al. |
| 7,557,736 B1 | 7/2009 | Daily et al. |
| 8,464,181 B1 | 6/2013 | Bailiang et al. |
| 2005/0018216 A1 | 1/2005 | Barsness et al. |
| 2006/0241859 A1 | 10/2006 | Kimchi et al. |
| 2007/0083408 A1 | 4/2007 | Altberg et al. |
| 2007/0083428 A1 | 4/2007 | Goldstein |

(Continued)

FOREIGN PATENT DOCUMENTS

WO 2005124594 A1 12/2005

OTHER PUBLICATIONS

U.S. Appl. No. 13/187,193, filed Jul. 20, 2011.

(Continued)

*Primary Examiner* — Naresh Vig
(74) *Attorney, Agent, or Firm* — Lerner, David, Littenberg, Krumholz & Mentlik, LLP

(57) ABSTRACT

Aspects of the disclosure relate to placing labels on photographic images so as not to obstruct a particular object. An image associated with a geolocation is identified, where the geolocation is based on a user action. The image is analyzed to identify at least first and second objects within the image. Object types for each object are determined. A determination is made that the first object is to be annotated with a label according to the first object type, and that the first and second object types differ. The image is also analyzed to determine a position on the second object to place the label so that the label does not obstruct the first object. Based on this analysis, the label is placed on the second object without obstructing the first object.

20 Claims, 12 Drawing Sheets

(56) References Cited

U.S. PATENT DOCUMENTS

| | | | | |
|---|---|---|---|---|
| 2009/0037103 A1* | 2/2009 | Herbst | ............... | G01C 21/3638 |
| | | | | 701/439 |
| 2011/0131597 A1* | 6/2011 | Cera | ..................... | G01C 21/32 |
| | | | | 725/24 |
| 2011/0321084 A1* | 12/2011 | Takahashi | .......... | H04N 5/23293 |
| | | | | 725/32 |
| 2012/0300089 A1* | 11/2012 | Sbaiz | ................. | H04N 1/00323 |
| | | | | 348/222.1 |

OTHER PUBLICATIONS

Frueh, Christian, Siddharth Jain, and Avideh Zakhor. "Data processing algorithms for generating textured 3D building facade meshes from laser scans and camera images." International Journal of Computer Vision 61.2 (2005): 159-184.

Bell, Blaine, Steven Feiner, and Tobias Höllerer. "View management for virtual and augmented reality." Proceedings of the 14th annual ACM symposium on User interface software and technology. ACM, 2001.

Snavely, N. et al., "Photo Tourism: Exploring Photo Collections in 3D," ACM Transactions on Graphics (SIGGRAPH Proceedings): vol. 25, No. 3: 835-846 (2006), accessed at http://phototourcs.washington.edu/Photo_Tourism.pdf, accessed on May 24, 2012, 12 pages.

Zhang, B. et al., "Annotating and Navigating Tourist Videos," ACM GIS '10, San Jose, CA (Nov. 2-5, 2010), accessed at http://research.microsoft.com/pubs/149304/Zhang_AnnotateVideos.pdf, accessed on May 24, 2012, 10 pages.

\* cited by examiner

LABEL PLACEMENT BASED ON OBJECTS IN PHOTOGRAPHIC IMAGES

CROSS REFERENCE TO RELATED APPLICATIONS

This application is a continuation of U.S. patent application Ser. No. 14/270,614, filed on May 6, 2014, which is a continuation of U.S. patent application Ser. No. 13/229,341, filed Sep. 9, 2011, the entire disclosures of which are hereby incorporated herein by reference.

BACKGROUND

As mobile devices become accessible and popular, users use them to view cities, neighborhoods and blocks. For example, instead of using a conventional map, a user is able to download a map of a city onto a mobile device that includes real-world images geocoded and specific locations. The objects in those real-world images may be labeled to identify and annotate the object. In examples, the objects may include the streets, buildings, restaurants, retail outlets, landmarks, bridges. Other images that are presented to the user may include advertisements that are interesting to the user.

However, the labels often obstruct the object within the image and interfere with the presentation of the image to the user. For example, a label may obstruct the restaurant that is associated with the label or obstruct an integral portion of a landmark that the label describes. Similarly, the label may obstruct other portions of the image. In another example, advertisements that are presented to a user for viewing the image may also interfere with the user's experience as they may obstruct the interesting objects the image.

BRIEF SUMMARY

Photographic images of geolocations made available through geographic information systems have not previously been used to display banner labels. Many of these photographic images include portions such as, for example, the top and bottom, that can be utilized for banner labels. The labels can be selected and displayed based on a number of factors such as, for example, the geolocation corresponding to the photographic image.

The embodiments described below include systems, methods, and computer storage mediums for placing such labels on photographic images of geolocations. An exemplary method includes retrieving a photographic image associated with a geolocation, where the geolocation is based on a user action. A label to place on the photographic image is also retrieved based on at least the geolocation. The photographic image is then analyzed to determine a position on the photographic image for placing the label in accordance with different objects in the image. Finally, the label is placed at the determined position on the photographic image.

Further features and advantages of this technology described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1A:
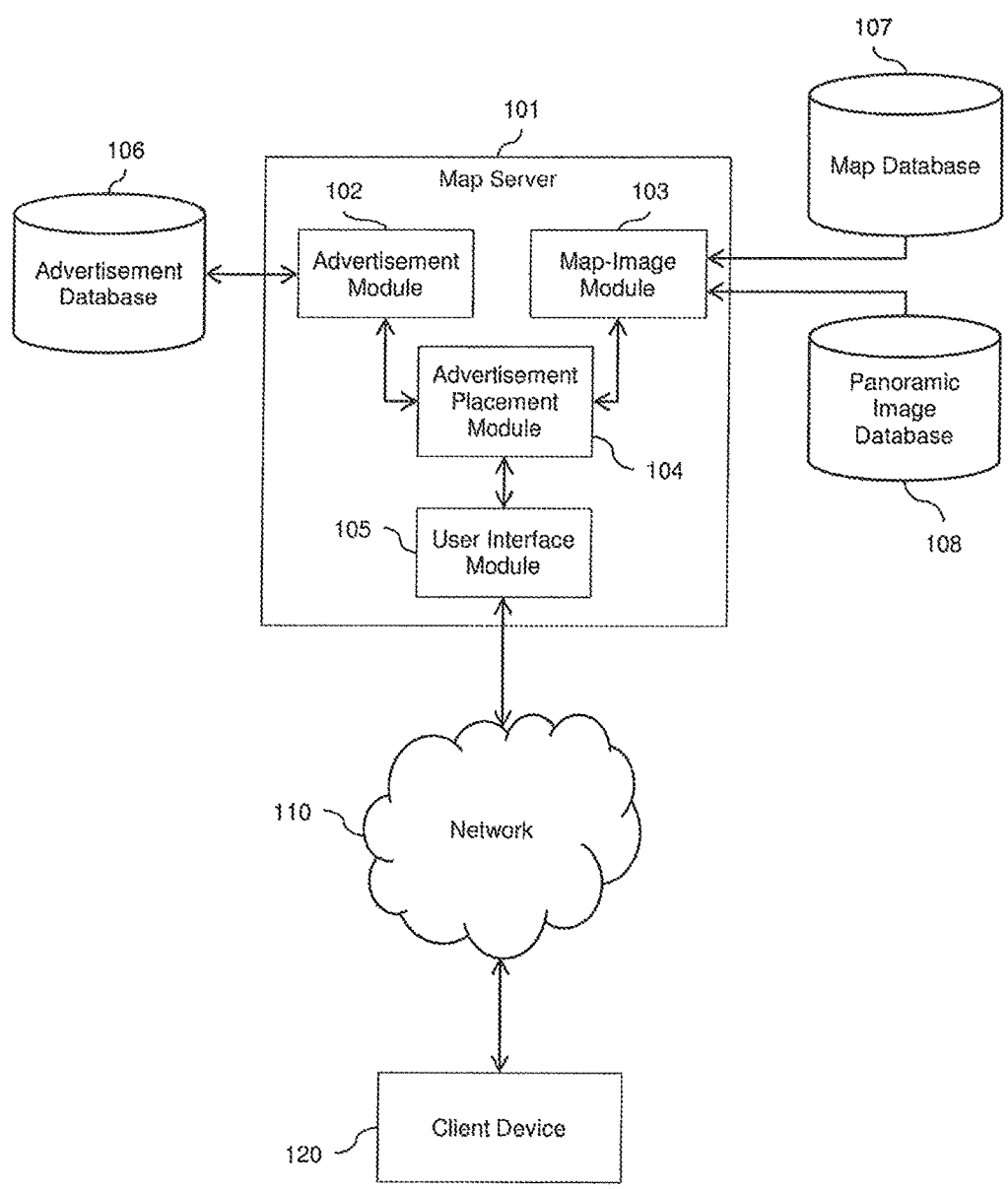
FIG. 1A is an example system environment that may be used to place advertisements on photographic images of geolocations.

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

The embodiments and accompanying figures described below generally relate to placing advertisements on photographic images of geolocations. In one embodiment, a photographic image associated with a geolocation and an advertisement based on the geolocation is retrieved from one or more databases. The photographic image is then analyzed to determine a position on the photographic image for placing the advertisement. The advertisement is then placed at the determined position on the photographic image.

This Detailed Description is divided into sections. The first and second sections describe example system and method embodiments that may be used to retrieve and place advertisements on photographic images of geolocations. The third section describes exemplary interfaces that can be used to carry out the embodiments described herein. The fourth section describes an example computer system that may be used to implement the embodiments described herein.

Example System Embodiments

FIG. 1 is an example system environment 100 that may be used to place advertisements on photographic images of geolocations. System 100 includes map server 101. Map server 101 includes advertisement module 102, map-image module 103, advertisement placement module 104, and user interface module 105. System 100 also includes advertisement database 106, map database 107, panoramic image database 108, network 110, and client device 120.

Network 110 can include any network or combination of networks that can carry data communication. These networks can include, for example, a local area network (LAN) or a wide area network (WAN), such as the Internet. LAN and WAN networks can include any combination of wired (e.g., Ethernet) or wireless (e.g., Wi-Fi or 3G) network components.

Client device 120 can include any computing device capable of communicating with a geographic information system ("GIS") including, for example, stationary computing devices (e.g., desktop computers) and mobile computing devices such as, for example, tablets, smartphones, or other network enabled portable digital devices. Mobile computing devices may utilize Global Positioning System ("GPS") data, touch-screen interfaces, and location services to assist with retrieving and displaying geolocation images and advertising units. Each of map server 101, client device 120, advertisement database 106, map database 107, and panoramic image database 108 also can run on any computing device. Each component may run on a distribution of computer devices or a single computer device. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Hardware can include, but is not limited to, a processor, memory and user interface display.

A. Map Server

Map server 101 can be any GIS capable of capturing, storing, manipulating, analyzing, managing, and presenting geographically referenced data. Map server 101 includes advertisement module 102, map-image module 103, advertisement placement module 104, and user interface module 105. These modules, however, are not intended to limit the embodiments described herein. Consequently, one of skill in the art will readily understand how the functionality described herein may be implemented by using one or more alternative modules.

1. Map-Image Module

Map server 101 includes map-image module 103 that is configured to retrieve a photographic image associated with a geolocation, where the geolocation is determined based on a user action. The photographic image can include either one image or a combination of images with fields of view up to and including 360 degrees. The photographic image can be associated with the geolocation coordinates of the image capture device when the image was captured. The geolocation coordinates can then be used to retrieve the photographic image from a database, such as, for example, panoramic image database 108.

In some embodiments, the user action can include changes in the user's geolocation. For example, the user's geolocation can be determined based on GPS data collected from client device 120. Map-image module 103 can utilize this GPS data to retrieve an image that corresponds to the user's geolocation.

In some embodiments, the user action can include a touch-screen gesture. For example, the user may view an image of a first geolocation on a mobile device configured to accept touch gestures. The user can then navigate to a second geolocation via a touch gesture such as, for example, panning the image, whereby map-image module 103 will retrieve an image that corresponds to the second geolocation.

In some embodiments, the user action can include a user selection. For example, the user can select a point on a map that can be utilized by map-image module 103 to determine the geolocation. This example is described in more detail in reference to FIG. 3, herein. The user action can also include the user selecting a point within an image of a neighboring geolocation. This example is described in more detail in reference to FIG. 4, herein. Additionally, in some embodiments, the user may select a URL link that navigates the user to a webpage that includes a map that references a geolocation or a photographic image of a geolocation.

Map-image module 103 may also be configured to retrieve a map or other geographically referenced data. This information may be acquired from a database such as, for example, map database 107. In one embodiment, map image module 103 retrieves a map and additional data indicating the geolocations on the map that have corresponding photographic images. The map and additional data may be made available for display to a user via user interface module 105. The additional data is not limited to indicating which geolocations have corresponding photographic images, but may also include business locations, street names, addresses, traffic information, or other useful geographically referenced data.

2. Advertisement Module

Map server 101 also includes advertisement module 102 that is configured to retrieve one or more advertisements to place on the photographic image. The advertisements may be stored with a collection of advertisements in a database such as, for example, advertisement database 106. The advertisements can be associated with an advertiser and can be based on various pricing models including, for example, cost-per-click (CPC) and cost-per-impression (CPM). A CPC pricing model charges the advertiser each time a user selects an advertisement associated with the advertiser. A CPM pricing model charges the advertiser each time an advertisement associated with the advertiser is displayed.

In some embodiments, the advertisements are retrieved based on the geolocation selected by a user. For example, if the user selects a geolocation from a map that corresponds to an intersection of two streets, advertisement module 102 may retrieve one or more advertisements associated with advertisers having business locations along the two streets.

In some embodiments, advertisements are retrieved based on one or more target factors. Target factors can be determined from information associated with a user such as, for example, a user profile. The user profile may store information such as, for example, previous searches conducted by the user, websites visited by the user, the location of the user, and demographic information about the user. When the user chooses to view a photographic image of a geolocation, advertisement module 102 may utilize the user's profile to retrieve a targeted advertisement. For example, if a user previously conducted a search for hotels at a location, advertisement module 102 may attempt to retrieve advertisements for hotels with locations proximate to the selected geolocation. Other information associated with a user may be used in a similar fashion to retrieve advertisements.

Target factors can also be determined from information associated with an advertiser such as, for example, a geographical range, a product or service category, key words, or target advertising demographics. This information may be stored with each advertisement or may be stored in an advertiser's profile. Advertisement module 102 may then utilize this information to select an advertisement targeted to information associated with the user and/or a geolocation selected by the user. For example, if a user previously conducted a search for hotels at a location, advertisement module 102 may locate advertisements from advertisers offering hotel services proximate to the geolocation selected by the user. Other information associated with an advertiser may be used in a similar fashion to retrieve advertisements.

In some embodiments, advertisements may be retrieved based on the outcome of an auction. The auction may allow multiple advertisers to compete for advertising space on a photographic image of a geolocation. The outcome of the auction may be based on information associated with the advertiser such as, for example, a geographical range, a product or service category, key words, or target advertising demographics. The outcome may also be based on, for example, the pricing model of the auction such as, for example, CPC or CPM, the price an advertiser is willing to pay, and/or the likelihood of a user selecting the advertisement.

3. Advertisement Placement Module

Map server 101 further includes advertisement placement module 104 that is configured to analyze a photographic image of a geolocation to determine a position on the photographic image for overlaying the advertisement. In some embodiments, advertisement placement module 104 analyzes the photographic image to determine the location of the top and/or the bottom of the image. For example, depending on the size of the advertisement, advertisement placement module 104 may determine a position at the very top or very bottom of the photographic image for placing the advertisement.

In some embodiments, advertisement placement module 104 analyzes the pixels of the photographic image to determine a location that is not within an area of interest to the user. For example, if the photographic image includes a building such as a landmark, advertisement placement module 104 may analyze the image to determine a position for placing the advertisement that does not include the landmark.

To analyze the photographic image, advertisement placement module 104 may consider data included with the image. In some embodiments, data may be included with the image that describes the scene captured in the image. For example, the data may include a distance value for one or more pixels in the image that indicates the distance between an object captured in the image and the image capture device. This data can be utilized to determine objects in the image such as, for example, streets, sidewalks, the sky, and other areas that may not be of interest to the user.

In some embodiments, advertisement placement module 104 will analyze the photographic image to locate pixels that represent the background of the photographic image. The background may include objects such as streets, sidewalks, and areas above and below a horizon line. These pixels may be located by comparing the color of each pixel with its neighboring pixels. Streets, for example, may be located by identifying large groups of similarly colored pixels positioned toward the bottom of the image. The areas above and below the horizon line, for example, may be located by first identifying the horizon line and then identifying the area above and below the horizon line. Horizon lines may be located by, for example, identifying a color change occurring along an approximately straight line across the photographic image. Other useful ways for locating objects in an image may also include the embodiments described in U.S. patent application Ser. No. 13/187,193, which is incorporated herein in its entirety. Aspects described in U.S. patent application Ser. No. 13/187,193 are also disclosed in FIGS. 6-11, and are discussed in detail below.

Advertisement placement module 104 is also configured to place the advertisement at the determined position on the photographic image once a position for placing the advertisement is determined. The advertisement may be placed on the photographic image by any image placement technique understood by a person of skill in the art.

4. User Interface Module

Map server 101 also includes user interface module 105. User interface module 105 is configured to display maps, geographically referenced data, and photographic images provided by map-image module 103 and advertisements provided by advertisement module 102.

User interface module 105 may also be configured to allow a user to select geolocations from either a map or a photographic image of a geolocation. Example embodiments are described below in reference to FIGS. 3 and 4.

User interface module 105 may also be configured to allow the user to select an advertisement placed on a photographic image. In some embodiments, when a user selects an advertisement, user interface module 105 directs the user to information associated with the advertisement. This may include, for example, navigating the user to an advertiser's landing webpage or another webpage designated by the advertisement.

B. Client Device Embodiment

Figure 1B:
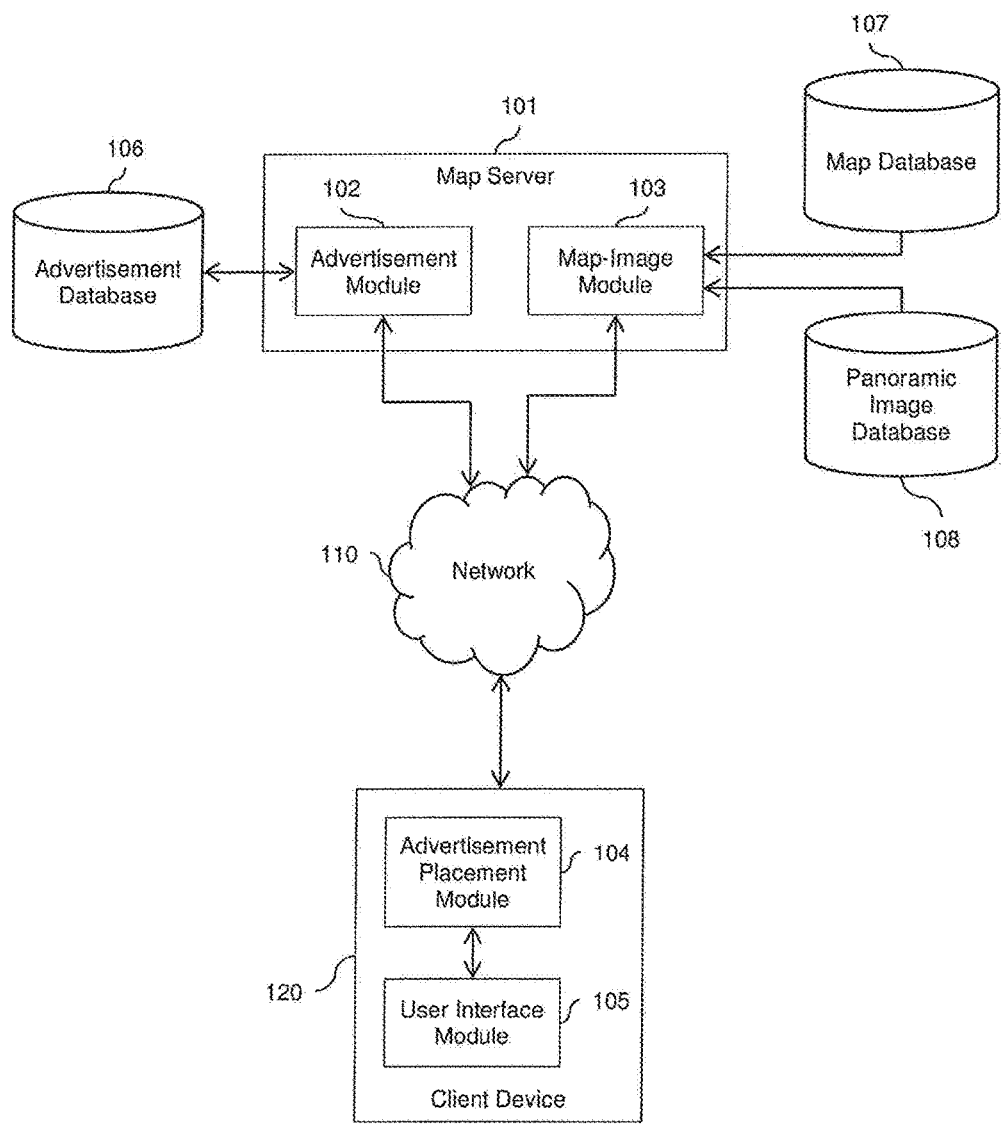
FIG. 1B is another example system environment that may be used to place advertisements on photographic images of geolocations.

FIG. 1B is an example system environment 100B that may be used to direct a user to an image of an advertiser's geolocation. System 100B includes map server 101. Map server 101 includes advertisement module 102 and map-image module 103. System 100B also includes advertisement database 106, map database 107, panoramic image database 108, network 110, and client device 120. Client device 120 includes advertisement placement module 104 and user interface module 105.

System 100B operates in a similar manner to system 100A except that the functions of advertisement placement module 104 and user interface module 105 are carried out by client device 120.

Advertisement placement module 104 communicates with advertisement module 102 and map-image module 103 via network 110. Advertisement placement module 104 retrieves a photographic image of a geolocation from map-image module 103. Advertisement placement module 104 also retrieves one or more advertisements from advertisement module 102. Advertisement placement module 104 then determines where to place the one or more advertisements on the photographic image using one of the placement techniques described above. The photographic image and the one or more advertisements are then displayed using user interface module 105 with the advertisements displayed in the determined locations.

Various aspects of embodiments described herein can be implemented by software, firmware, hardware, or a combination thereof. The embodiments, or portions thereof, can also be implemented as computer-readable code. For example, advertisement unit module 102, map-image module 103, advertisement placement module 104, and user interface module 105 may be implemented in one or more computer systems or other processing systems. The embodiments in systems 100A and 100B are not intended to be limiting in any way.

Example Method Embodiments

Figure 2:
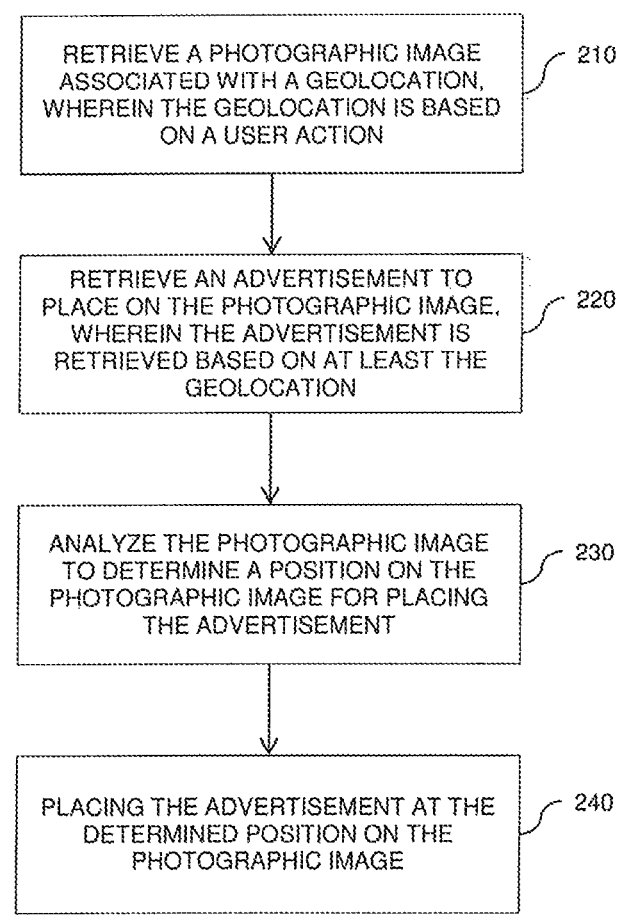
FIG. 2 is a flowchart illustrating an exemplary method for placing advertisements on photographic images of geolocations.

FIG. 2 is a flowchart illustrating an exemplary method 200 for placing advertisements on photographic images of geolocations. While method 200 is described with respect to one embodiment, method 200 is not meant to be limiting and may be used in other applications. Additionally, method 200 may be carried out by systems 100A or B, for example.

Method 200 retrieves a photographic image associated with a geolocation, where the geolocation is based on a user action (step 210). In some embodiments, the user action is based on the user selecting a point on a map or a point in a photographic image of a geolocation. In some embodiments, the user action is based on the user selecting a URL link that navigates that user to a webpage that includes a map referencing a geolocation or a photographic image of a geolocation. In some embodiments, the user action is based on the user's geolocation. Step 210 may be carried out by map-image module 103 embodied in systems 100A or 100B, for example.

Method 200 also retrieves one or more advertisements to place on the photographic image (step 220). In some embodiments, the advertisements are retrieved based on the geolocation selected by the user, information associated with the user, information associated with the advertiser, and/or the outcome of an auction between advertisers. Step 220 may be carried out by advertisement module 102 embodied in systems 100A or 100B, for example.

Method 200 then analyzes the photographic image to determine a position on the photographic image for placing the advertisement. In some embodiments, the position is determined by using data included with the photographic image or by comparing each pixel in the image to its neighboring pixels. Step 230 may be carried out by advertisement placement module 104 embodied in systems 100A or 100B, for example.

Finally, method 200 places the advertisement at the determined position on the photographic image. Any method for placing one image on another image may be used. These placement techniques would be understood by a person of skill in the art. Step 240 may be carried out by advertisement placement module 104 embodied in systems 100A or 100B, for example.

Additional Example Embodiments

While system 100A embodied in FIG. 1A shows map server 101 including advertisement module 102, map-image module 103, advertisement placement module 104, and user interface module 105, map server 101 can include more or fewer modules. Similarly, while system 100B embodied in FIG. 1B shows map server 101 including advertisement module 102 and map-image module 103, and client device 120 including advertisement placement module 104 and user interface module 105, map server 101 and client device 120 can also include more or fewer modules. Additionally, map server 101 and client device 120 may each include a combination of the modules described above.

Below are example interfaces that may be used to implement the embodiments described with reference to systems 100A and 100B, and method 200.

A. Example Map Interface

Figure 3:
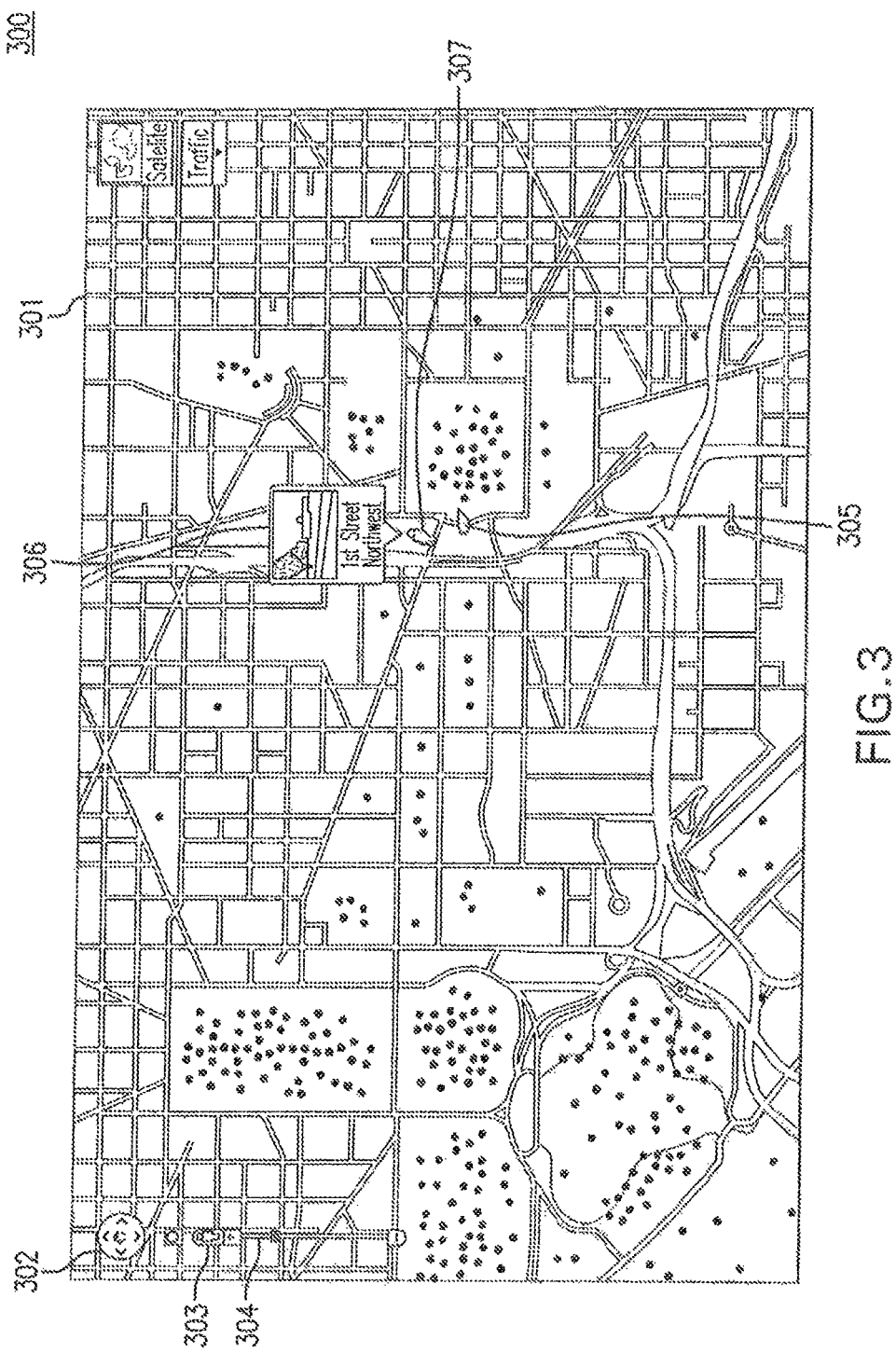
FIG. 3 is an example map interface that may be used to allow a user to select a geolocation, according to one embodiment

FIG. 3 is an example map interface 300 that may be used to allow a user to select a geolocation, according to one embodiment. Map interface 300 includes map 301, compass 302, pegman selector 303, scale control 304, orientation indicator 305, preview 306, and pegman 307.

In some embodiments, map 301 is retrieved from map database 107 by map-image module 103. Once map-image module retrieves map 301, map 301 can be displayed to a user through user interface module 105 via advertisement placement module 104. User interface module 105 may then add one or more interface elements to map 301 such as, for example, compass 302, pegman selector 303, scale control 304, orientation indicator 305, preview 306, and pegman 307.

Compass 302 may be used to either rotate map 301 to an alternate orientation or pan map 301. Pegman selector 303 may be used to select pegman 307 for placing onto map 301. Scale control 304 may be used to change the zoom factor of map 301. Orientation indicator 305 may be used to indicate the anticipated orientation of a photographic image that will be displayed when pegman 307 is placed on map 301. Preview 306 may be used to show a thumbnail image of a photographic image that corresponds to the geolocation indicated by pegman 307. Pegman 307 may be used to select a point on map 301 and retrieve a photographic image of a geolocation that corresponds to the selected point. Some or all of these interface elements may be included in one or more embodiments. Additionally, map interface 300 is not intended to limit the embodiments described herein.

B. Example Panoramic Interface

Figure 4:
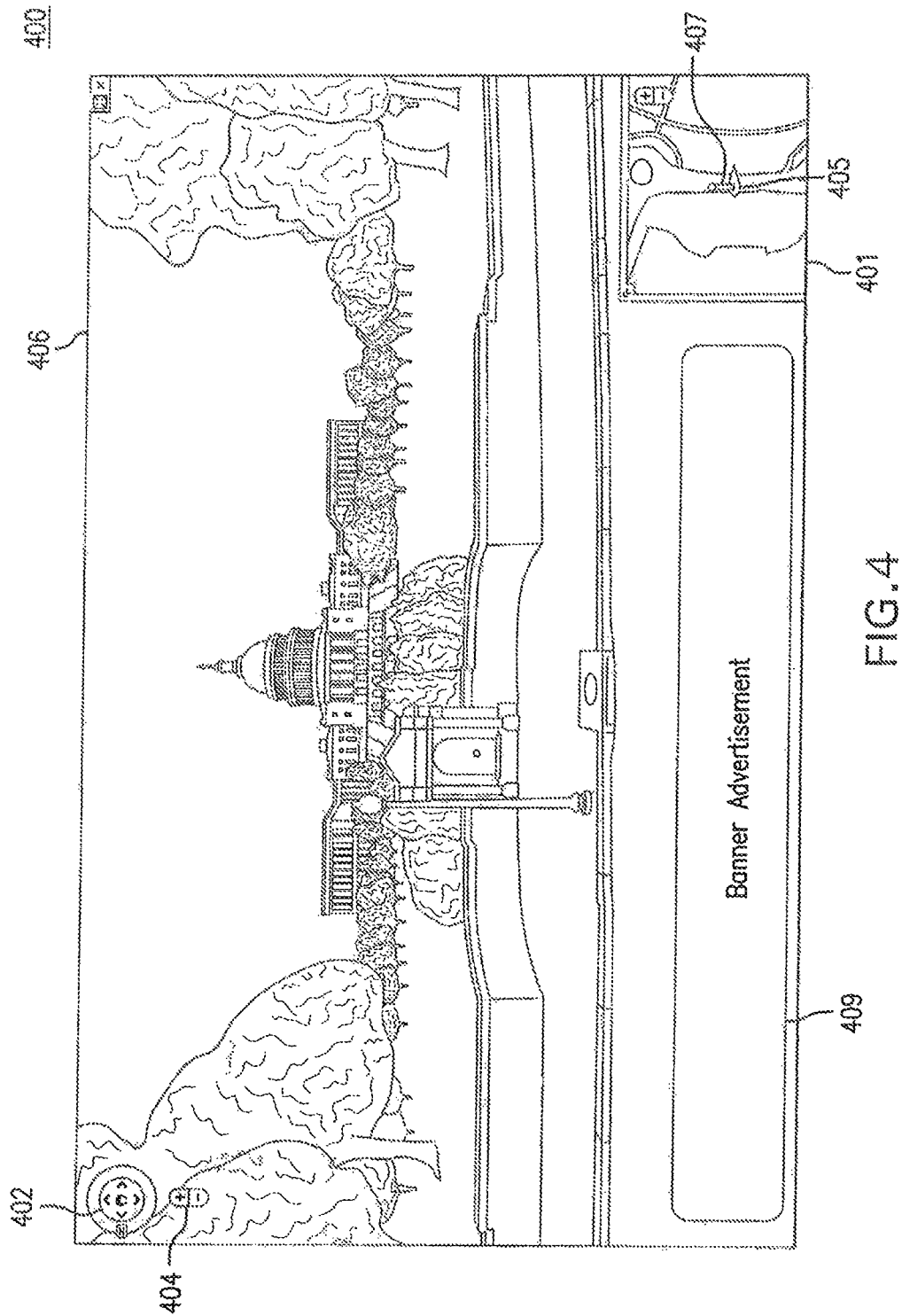
FIG. 4 is an example panoramic interface of a geolocation that includes a photographic image and an example advertisement that is placed on the image, according to one embodiment.

FIG. 4 is an example panoramic interface 400 of a geolocation that includes a photographic image and an example advertisement that is placed on the image, according to one embodiment. Panoramic interface 400 includes map 401, compass 402, image scale control 404, orientation indicator 405, panoramic image 406, pegman 407, and advertisement 409.

In some embodiments, panoramic image 406 is retrieved from panoramic image database 108 by map-image module 103. Advertisement 409 is also retrieved from advertisement database 106 by advertisement module 102. Advertisement placement module 104 then places advertisement 409 onto panoramic image 406. Panoramic image 406 is then displayed to a user through user interface module 105 via advertisement placement module 104. User interface module 105 may add one or more interface elements to panoramic image 406 such as, for example, map 401, compass 402, scale control 404, orientation indicator 405, and pegman 407.

Compass 402 may be used to either rotate the map 401 to an alternate orientation or select a new geolocation. Scale control 404 may be used to change either the zoom factor of map 401 or the zoom factor of panoramic image 406. Orientation indicator 405 may be used to indicate the current orientation of panoramic image 406. Panoramic image 406 may be used to show the photographic image corresponding to the geolocation selected by a user. Pegman 407 may be used to indicate the geolocation on map 401 that corresponds to panoramic image 406.

Panoramic interface 400 may also include interface controls that allow a user to select points within panoramic image 406 and navigation controls to navigate through neighboring panoramic images. If a point within panoramic image 406 is selected, a panoramic image corresponding to the selected point may be displayed with a placed advertisement. If the user navigates to a neighboring panoramic image, the neighboring image may be displayed with a placed advertisement. Other interface controls may also be provided to assist with navigating through panoramic images.

Some or all of the interface elements and controls described herein may be included in one or more embodiments. Additionally, panoramic interface 400 is not intended to limit the embodiments described herein.

Example Computer System

Figure 5:
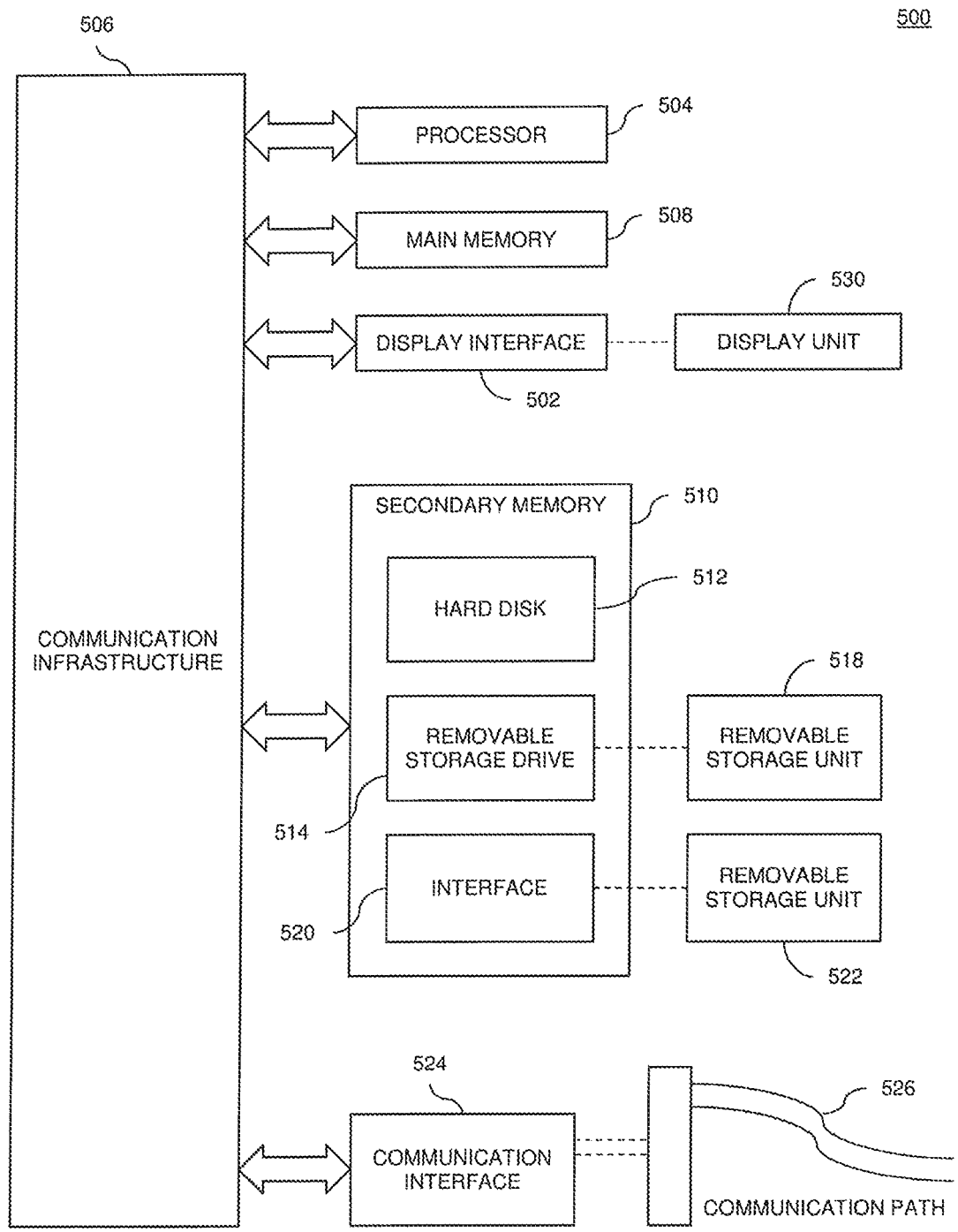
FIG. 5 illustrates an example computer in which embodiments of the present disclosure, or portions thereof, may be implemented as computer-readable code.

FIG. 5 illustrates an example computer system 500 in which embodiments of the present disclosure, or portions thereof, may be implemented. For example, map server 101, advertisement database 106, map database 107, panoramic image database 108, and client device 120 may be implemented in one or more computer systems 500 using hardware, software, firmware, computer readable storage media having instructions stored thereon, or a combination thereof.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement the technology using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well-known manner. Removable storage unit 518 may include a floppy disk, magnetic tape, optical disk, flash drive, etc. which is read by and written to by removable storage drive 514. As will be appreciated by persons skilled in the relevant art, removable storage unit 518 includes a computer readable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 518, removable storage unit 522, and a hard disk installed in hard disk drive 512. Computer storage medium and computer readable storage medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the embodiments described herein. In particular, the computer programs, when executed, enable processor device 504 to implement the processes of the embodiments, such as the stages in the methods illustrated by flowchart 200 of FIG. 2, discussed above. Accordingly, such computer programs represent controllers of computer system 500. Where an embodiment is implemented using software, the software may be stored in a computer storage medium and loaded into computer system 500 using removable storage drive 514, interface 520, and hard disk drive 512, or communications interface 524.

Aspects of the disclosure further relate to appending labels to a reconstructed image of a real world location that is displayed on a computing device, such that the labels do not interfere with the presentation of an image to the user. For example, when an image is processed in an image processing system, the image processing system identifies the objects in the image that require labels. Unlike conventional systems that simply append the label on the object and thus interfere with the user's viewing of the object or other objects, the image processing system identifiers object in the image, such as a road or a sky, that can include the label without the label interfering with the viewing experience of a user and appends the label on the identified object.

Figure 6:
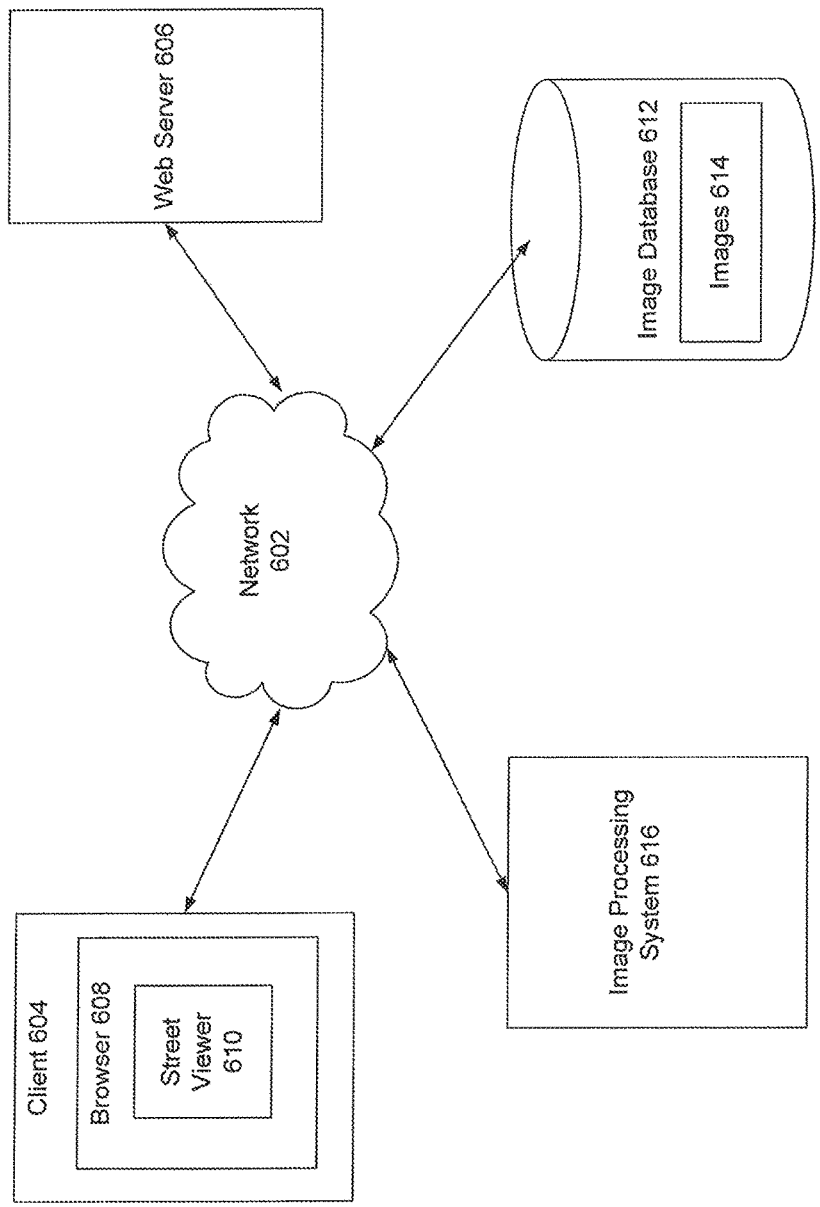
FIG. 6 is a block diagram of a distributed system in which embodiments of the present disclosure can be implemented.

FIG. 6 is a block diagram of a client-server environment 600 according to further aspects of the technology. Client-server environment 600 includes one or more networks 602, clients 604, and web servers 606.

Network 602 may be any network or combination of networks that can carry data communications. Such a network 602 may include, but is not limited to, a local area network, metropolitan area network, and/or wide area network such as the Internet. Network 602 can support protocols and technology including, but not limited to, World Wide Web (or simply the "Web") protocols and/or services. Intermediate web servers, gateways, or other servers may be provided between components of the system shown in FIG. 6, depending upon a particular application or environment.

Client 604 is an electronic device that accepts input from a user and is capable of requesting and receiving resources over network 602. Example clients 604 are personal computers, mobile communication devices and tablet computers. Client 604 typically includes an application, such as a web browser (or simply browser) 608. Browser 608 facilitates the sending and receiving of data and resources over network 602 and the displaying of data on client 604.

A user uses browser 608 to request resources over network 602. A user requests resources either by typing the resource address associated with resource. In response to a request, web server 606 delivers resources as websites to client 604. When client receives a website from web server 606, client 604 uses browser 608 to display the website to the user.

Web server 606 is a computing device or an application executing on a computing device that helps deliver resources to clients 604. Resources are either stored on web server 606 or on another computing device that is accessible to web server 606 through network 602.

A street viewer 610 is an example of a resource that may be delivered to client 604 and viewed using browser 608. Street viewer 610 may be hosted on web server 606 and may be accessed by client 604 using a resource address. When a website that includes street viewer 610 is downloaded onto client 604, street viewer 610 allows client 604 to display images of a real-world location on browser 608.

Street viewer 610 displays images of locations around the world. For example, street viewer 610 displays street-level imagery of cities, landmarks, street corners, museums, etc. Street viewer 610 requests images of a real-world locations, from image database 612. Street viewer 610 obtains the coordinates, when, for example, a user is presented with a map of city or a city block, displayed as squares or rectangles and requests an image of the location by positioning the cursor on a particular location on the map. In an embodiment, street viewer 610 converts the coordinates indicated by the cursor into geographic coordinates such as a longitude and latitude coordinates and sends the request with those coordinates to image database 612 or to an intermediate web server, such as server 606 that in turn accesses image database 612.

Image database 612 stores image 614. Image 614 is a reconstructed image that was reconstructed from the camera and laser data. In an example, image 614 may include both a panoramic image and corresponding depth map. Each image 614 is associated with image coordinates that correspond to the real-world location of image 614. In an embodiment, image 614 may include labels. Labels on image 614 describe objects, such as restaurants, landmarks, buildings, etc. included in image 614. Unlike labels in the conventional images, labels in image 614 are annotated to objects in image 614 such that the labels do not interfere with the experience of the user viewing the image. Example objects in image 614 that can include labels are objects presenting a road or a sky, if any.

When a user desires to view image 614 of a particular location, a user uses street viewer 610 to retrieve and display image 614. For example, a user clicks on a map-like representation of a city in street viewer 610 that includes geographic coordinates of image 614. Street viewer 610 then generates a message to image database 612 that includes the geographic coordinates of image 614. In response, image database 612 retrieves image 614 that is associated with the requested geographic coordinates and returns image 614 to client 604, where image 614 is displayed using street viewer 610.

A person skilled in the art will appreciate that image database 612 may be any type of a memory storage device, such as a database, a server, a repository, or other storage device known to a person skilled in the relevant art. Image database 612 may be included on web server 606 or another computing or storage device that communicates with web server 606 using network 602.

Images 614 are collected, for example, using a car equipped with a camera, a laser sensor, and a GPS device. When a car is driven around a neighborhood, the camera takes pictures of the neighborhood at configurable intervals, such as every "f" feet, or every "t" seconds.

Laser sensors (e.g., LIDAR sensors) generate a point cloud representation of the objects within the neighborhood. A point cloud representation is a representation of the dimensions of the real-world objects, such as buildings, facades, windows, etc. within the image. For example, a laser generates a beam that is aimed at different objects within a location, such as a neighborhood. The sensor associated with the laser collects the laser beam that is reflected from the real-world objects and generates a point cloud in the (x, y, z) coordinate system that is based on the collected laser beam. A person skilled in the art will appreciate that an "x" coordinate indicates the horizontal axis in the point cloud, a "y" coordinate indicates a vertical axis in the point cloud, and a "z" coordinate indicates a depth in the point cloud. Thus, when a laser sprays a laser beam onto the building, the resulting point cloud reflects the façade, roof, windows, doors, etc. that are of varying depths of the sprayed building. The person skilled in the art will appreciate that the denser the laser spray, the more accurate the point cloud of the actual real-world object is produced. Laser sensors may also determine a representation of a sky in the point cloud by identifying points in the point cloud that have an infinite "z" coordinate, as the laser does not reflect back to the laser sensor when the laser points at the sky. Laser sensors may also determine a representation of a road in a point cloud by determining a shape that has a constant or near constant "y" coordinate.

The GPS device collects the real-world coordinates that correspond to the image produced by a camera and a point cloud generated by a laser. For example, GPS device collects the real-world coordinates at the same time as a camera takes a picture. In further embodiments, accuracy of the GPS data may be improved using wheel encoders installed on the vehicle, and the location data may be snapped to known locations of streets.

As mentioned above, the camera may successively collect images at various points along a path. In an example, the camera may be a panoramic camera with multiple image sensors that captures images from different directions coincidentally. The images may then be stitched together into a 360-degree panoramic image. The panoramic image may be associated with a geographic location collected by the GPS device at the time that the image was taken.

Any three-dimensional laser data collected at that time may also be associated with the same geographic location. For example, the point cloud may be used to generate a depth map representing three-dimensional data corresponding to respective pixels in the panoramic image. The depth map may include a numeric value corresponding to each pixel on the panoramic image. The numeric value represents a distance from the associated geographic location (collected by the GPS) to an object in three-dimensional space, such as a tree or building.

Figure 7:
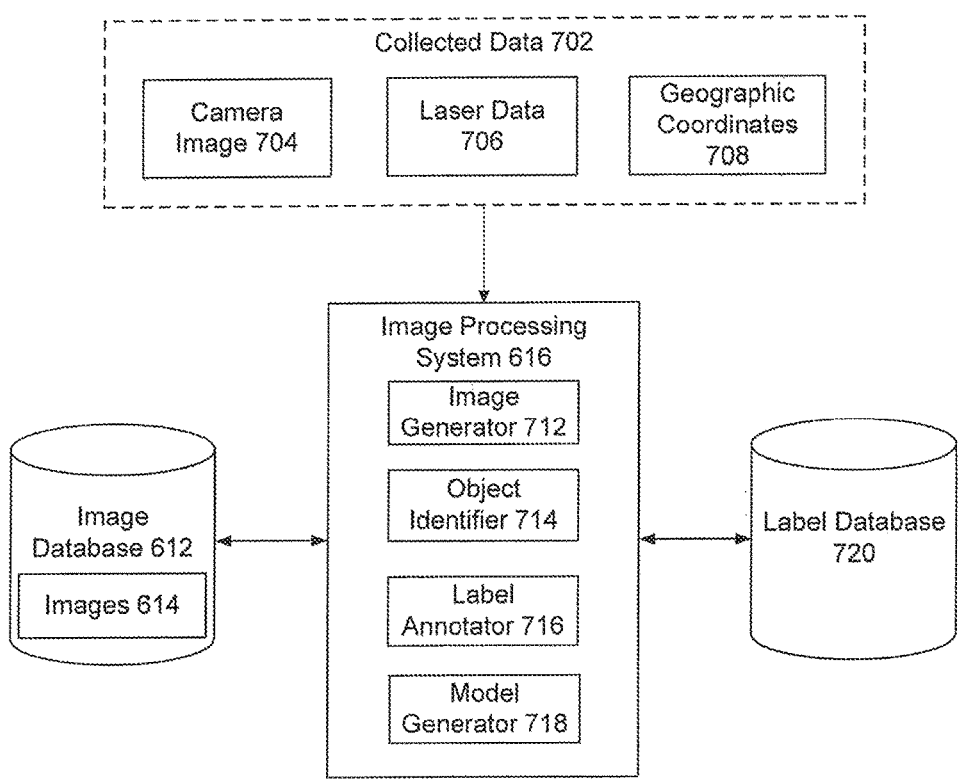
FIG. 7 is a block diagram of an image processing system, according to aspects of the technology.

After the data is collected, the data is sent to image processing system 616. FIG. 7 is a block diagram 700 showing an image processing system, according to an embodiment. Image processing system 616 processes images 614 from a collected data 702. Image processing system 616 receives collected data 702 that, for example includes data from a camera, a GPS device and a laser sensor. In an embodiment, collected data 702 may be uploaded to image processing system 616 from a portable memory device or using network 602.

Collected data 702 includes camera image 704, laser data 706, and geographic coordinates 708. Camera image 704 may be a JPG, GIF, TIFF, PNG, BMP or any other image type known to a person of ordinary skill in the art. Laser data 706 is a point cloud representation of image 704, and geographic coordinates 708 are the real-world coordinates of the image 704 as identifies by the GPS device. In an embodiment, laser data 706 includes a point cloud which is a set of vertices in a 3D coordinate system using "x", "y" and "z" coordinates. Typically, when the laser sprays the laser beam onto a real-world object, laser data 706 may be included in a data file that image generator 712 receives and processes. In another embodiment, geographic coordinates 708 may be generated without use of LIDAR. For example, geographic coordinates 708, such as using a structure-from-motion algorithm. In that embodiment, features from the respective photographs taken along a street may be detected and matched with one another. As a result of the detection and matching, pairs of corresponding two-dimensional points on the photographs may be identified. For each pair of two-dimensional points, a point in three-dimensional space may be calculated using stereo triangulation. In this way, cloud of points 602 may also be determined using photographic images.

Image processing system 616 includes an image generator 712, an object identifier 714 and a label annotator 716. Object generator 712 retrieves camera image 704 and laser data 706 from collected data 702 and generates a panoramic image.

Image generator 712 generates image 614 from camera image 704 and laser data 706. Generating image 614 may involve stitching together multiple camera images. In an example embodiment, image 614 may be texture mapped to a three-dimensional model such as a sphere, cylinder, or a three-dimensional model generated by model generator 718 from laser data 706.

Model generator 718 derives a three-dimensional model from laser data 706 for geographic coordinates 708. The derived three-dimensional model represents at least a portion of the content within image 614's field of view. To generate the three-dimensional model, three dimensional shapes or facades may be fit into geographic coordinates 708 using search and optimization techniques. In one example, a shape may be selected from a plurality of primitive shapes. The plurality of primitive shapes may include a box, gable, hip, pyramid, top-flat pyramid, cylinder or ramp. With a shape selected, geometric parameters defining aspects of the shape may be optimized. The geometric parameters may include, for example, a position of an origin point (e.g., x, y, and z coordinates), a scale (e.g., height and width), and orientation (e.g., pan, tilt, and roll). The geometric parameters may be optimized using a best-fit or regression analysis algorithm, such as least-squares, or an adaptive optimization algorithm. Examples of adaptive optimization algorithms include, but are not limited to, a hill-climbing algorithm, a stochastic hill-climbing algorithm, an A-star algorithm, and a genetic algorithm. Different geometric shapes may be tried, and a shape having the best fit (as determined by a cost function) may be selected. Similarly, planes may be fit to geographic coordinates 708 to represent building facades and street facades.

When image 614 and its corresponding three-dimensional model have been determined, object identifier 714 determines the types of objects displayed in the 3D representation of image 614. For example, object identifier 714 determined, based at least in part on the three-dimensional model data, the location of objects in image 614, such as buildings, roads, sky, cars, etc. Object identifier 714 may extract the location of objects from the three-dimensional data using a variety of heuristics. In a first example, object identifier 714 identifies that an object is a sky by identifying coordinates in laser data 708 that have an infinite "z". In a second example, object identifier 714 identifies that an object is a road by identifying a horizontal facade below a predetermined elevation, e.g., to distinguish between horizontal facades representing roofs and those representing streets. In a third example, object identifier may identify that an object is a building by detecting vertical, or substantially vertical, facades that run along a street, perhaps parallel with a street.

Object identifier 714 may also determine the area of image 614 occupied by each detected object. This may involve matching three-dimensional model data representing the object to an area of a two dimensional image. In an embodiment where the three-dimensional model data is represented as a depth map, the pixels representing the object in the two-dimensional image may be identified using the corresponding pixels in the depth map representing the object. In an embodiment where the there-dimensional model data is represented in a three-dimensional coordinate system, a projection may be needed to determine the area occupied by the image. For example, using data representing a camera that took the image (such as position, angle and focal length), the three-dimensional data representing the object may be projected onto the two-dimensional image 614. When object identifier 714 identifies an object in image 614, object identifier stores the type of the object and the area occupied by the object in credential data associated with each object in image 614.

Image processing system 616 uses label annotator 716 to annotate labels to image 614 that allow a user to access information that describes the objects included in image 614. Label annotator 716 annotates labels to objects in image 614, such that the labels do not interfere with the presentation of image 614 to the user.

Label annotator 716 accesses the object type that is associated with each object in image 614 and, based on the object type, determines objects that require labels. For example, objects in image 614 that include restaurants, shops, landmarks, street signs, etc. may require labels.

In an embodiment, label annotator 716 may receive a listing of labels and the associated information about the objects located at a particular location in image 614 from label database 720 (described below). In an example, label annotator 716 may label database 720, a listing of labels associated with image 614. In another example, each label may have a geocode identifying a geographic location of an object that it annotates, and image 614 may have a geocode representing a position of a camera when it took image 614. In that example, label annotator 716 may retrieve labels geocoded in proximity to the geocode associated with image 614.

Typically, in conventional systems labels are presented directly on the image where an object associated with a label is located or at a fixed offset from the object's location. For example, in conventional systems if an image describes a building with a restaurant on the ground floor the conventional system will include the label of the restaurant where the restaurant is located. This may result in a negative user experience because the label of the restaurant may obstruct the building, the restaurant or other landmarks in the image that are interesting to the user. Similarly, when an image includes a landmark, such as an Eiffel Tower, a conventional system will place the label over the Eiffel Tower. Again, this will result in a negative user experience as the Eiffel Tower presented to a user may be obstructed by the Eiffel Tower label.

Unlike conventional systems, label annotator 716 overlays labels that describe an object, on an object that is not interesting to the user. Label annotator 716 may place labels on objects that represent a road or a sky on image 614. For example, if an object in image 614 includes a restaurant on the ground floor of a building, label annotator 716 appends the label that describes a restaurant on an object that represents the sky. In another example, in the image of an Eiffel Tower label annotator 716 may include the label of an Eiffel Tower in the sky above the Eiffel Tower or on a road that leads to the Eiffel Tower. As a result, when a user is presented with image 614 on street viewer 610, the objects in image 614 that are of interest to the user are not obstructed by the labels.

Label database 720 includes labels for objects that are streets, and businesses, landmarks, etc. that correspond to the real-world location presented in image 614. For example, label database 720 may include labels for a real-world location that corresponds to geographic coordinates 708. Labels typically include information or describe an object associated with the label. Additionally, label database 720 may include links to a website of an object, advertisements and other information that may be associated with a label.

In an embodiment, label annotator 716 may insert a pointer from the label to an object that a label describes. For example, label annotator 716 may include a pointer from a label appended to a sky to a restaurant or a landmark on image 614 that the label describes. An example pointer may be an opaque line, dotted line, etc., such that the label does not interfere with the presentation of image 614 to the user.

A label may display information about the associated object when the label is activated. To active a label, a user may click or point to the label. Once clicked, the label may dynamically generate information about the associated object. In an embodiment, the dynamically generated information is also presented to the user viewing image 614 such that the information does not interfere with image 614. For example, the dynamically generated information may replace or temporarily replace the position on image 614 that was occupied by a label.

In another embodiment, a label may include an input module that receives an action from a user. In one embodiment the label may include a link. When an image is presented a user, a user may click on the link which results in the user being routed to a website that is associated with a label. For example, when a label describes a restaurant on ground floor of a building, a user may click on a label and be directed to a website associated with the restaurant or a website that displays the reviews for the restaurant or displays a menu. Similarly, when a label that includes a link points to the Eiffel Tower, a user may click on the link and be directed to a website that includes historical information of the Eiffel Tower, its hours of operation, a way to obtain tickets, etc.

In another embodiment, a label may provide a user with access to a search box or menu, such as a drop-down menu. A search box and a menu are exemplary input modules that receive an action from a user and facilitate access to browser 608 using street viewer 610. For example, label annotator 716 may include a label that becomes search box or a menu on image 614 when a user positions a cursor over the label. If, when a user uses the input module, the input module blocks an object in image 614, input module may also dynamically change positions to another object in image 614, where the menu does not interfere with the experience of the user.

When image processing system 616 generates image 614 and labels for image 614, image processing system 616 stores image 614 and the labels associated with image 614 in image database 612.

When a user requests image 614 using street viewer 610 for a particular real-world location, client 604 sends a request message for image 614 to image database 612 that includes geographic coordinates of the image. In response, image database 612 retrieves image 614 and labels associated with image 614, and forms a response message. The response message includes image 614 and the associated labels that image database 612 transmits to client 604. In an embodiment, image database 612 may transmit the response message directly to client 604 or through web server 606.

When client 604 receives a response message from web server 606, browser 608 uses street viewer 610 to present image 614 to a user. When a user views image 614, image 614 includes labels that include information about different objects in the image. The labels are position in image 614 such that the labels do not obstruct objects in image 614 that are interesting to the user.

Referring back to FIG. 6, while a separate image processing system 616 is shown for illustrative purposes, a person of skill in the art would recognize that its functional elements may be allocated between client 604 and web server 606. In another illustrative example, model generator 718 and image generator 712 may operate on a back-end server such as image processing system 616 or web server 606, and object identifier 714 and model generator 718 may operate on client 604.

Figure 8:
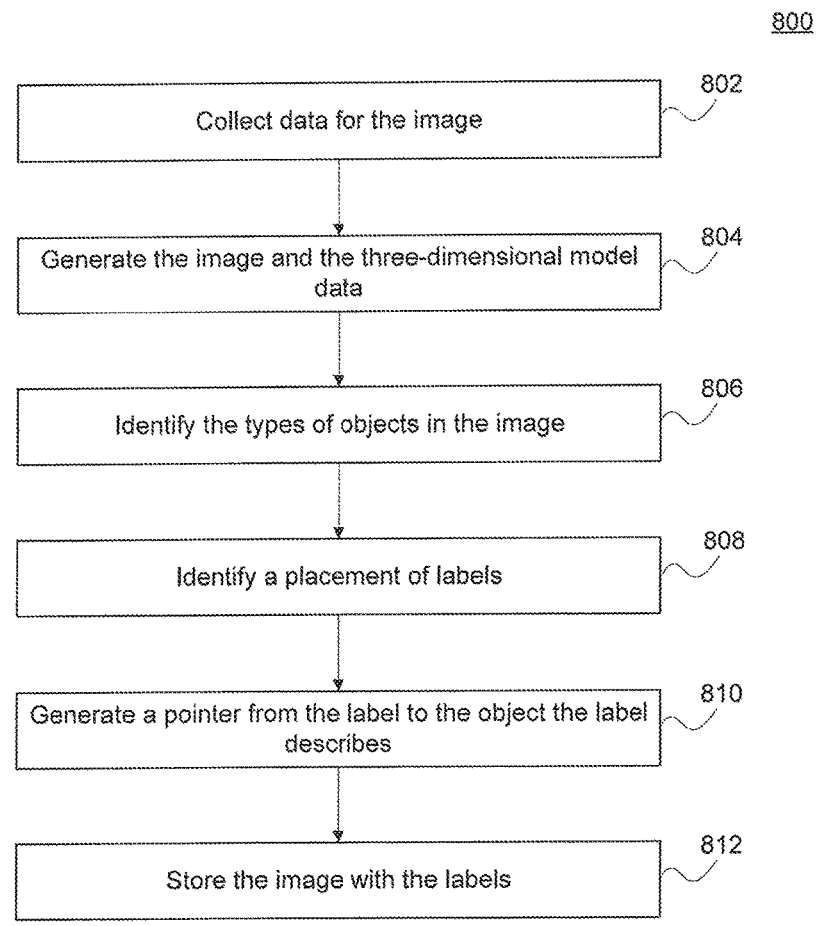
FIG. 8 is a flowchart of a method for identifying a placement of a label on the image, according to aspects of the technology.

FIG. 8 is a flowchart of a method 800 for identifying a placement of a label on an image, according to an embodiment.

At step 802, the data that generates an image is collected. For example, the data may be collected using at least a camera, a laser sensor and a GPS device. As described herein, the camera produces a picture of an image. The laser sensor produces a point cloud of one or more object included in the image and generates depth to the image. The GPS device produces the geographic coordinates of the location of the image in the real-world.

At step 804, an image and corresponding three-dimensional model are created from the collected data. For example, the data collected in step 802 is sent to image processing system 616 which may stitch together several images to generate image 614 and fit a three-dimensional model to the collected geographic points. In an embodiment, image 614 is a 3D image that may be reconstructed from multiple 2D images generated from the collected data.

At step 806, a type of an object in the image is identified. For example, object identifier 714 identifies objects in image 614 that represent buildings, windows, bridges, landmarks, street signs, restaurants or stores that are located in the buildings, roads, a sky, etc. Label annotator 716 uses the type of the object to determine whether the object requires a label and whether the object can include a label without interfering with the viewing experience of a user.

At step 808, a placement of labels in the image is determined. For example, label annotator 716 determines the objects in image 614 that require labels and objects that can display the labels. Once label annotator 716 identifies the objects that require labels, label annotator 716 annotates labels on the object in image 614 that can include the labels, in such a way that the labels do not obstruct the objects that are interesting to the user.

At an optional step 810, a pointer from a label to an object that the label describes is generated. For example, label annotator 716 generates a pointer from a label to the object in image 614 that the label describes. In an embodiment, label annotator 716 also includes a link associated with the label that once clicked, presents a user with information regarding the associated object.

At step 812, an image and labels are stored. For example, image 614 and the annotated labels are stored in image database 612.

Figure 9:
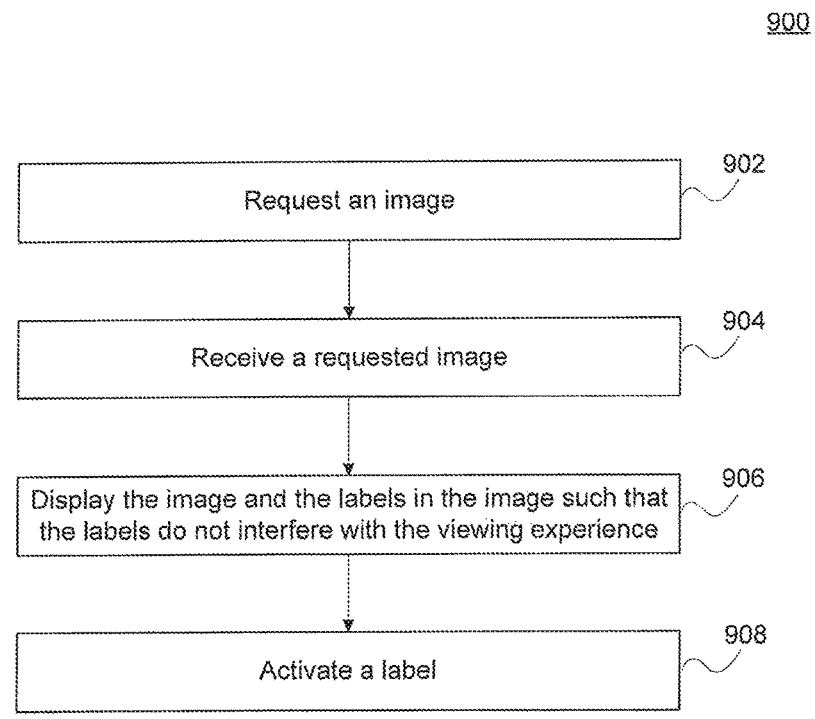
FIG. 9 is a flowchart of a method showing receiving an image with labels on a client device, according to aspects of the technology.

FIG. 9 is a flowchart of a method 900 for displaying an image with the labels on a client device, according to an embodiment.

At step 902, a client sends a request message for an image. For example, browser 608 uses street viewer 610 to request image 614 from image database 612.

At step 904, a client receives a response message that includes the requested image. For example, image database 612 retrieves image 614 and sends image 614 that includes annotated labels to client 604.

At step 906, an image is displayed. For example, street viewer 610 displays image 614 and the annotated labels. When street viewer 610 displays image 614, the labels are displayed on objects that do not interfere with the presentation of image 614 to the user. For example, as described herein, the labels for objects appear on objects that represent a road or a sky, such that they do not obstructs buildings, street signs, landmarks, restaurants, etc. In an embodiment, street viewer 610 may display pointers from the labels to the objects that the labels describe.

At step 908, a label is activated. For example, when image 614 includes a label that includes a link, a user may activate the label by clicking or pointing to the label. In response, the label may display information to the user about an object associated with the label. In another embodiment, once the user clicks on the link, the link may present a user with a menu that is also displayed on the objects in image 614 such that they do not block interesting portions of image 614.

Figure 10:
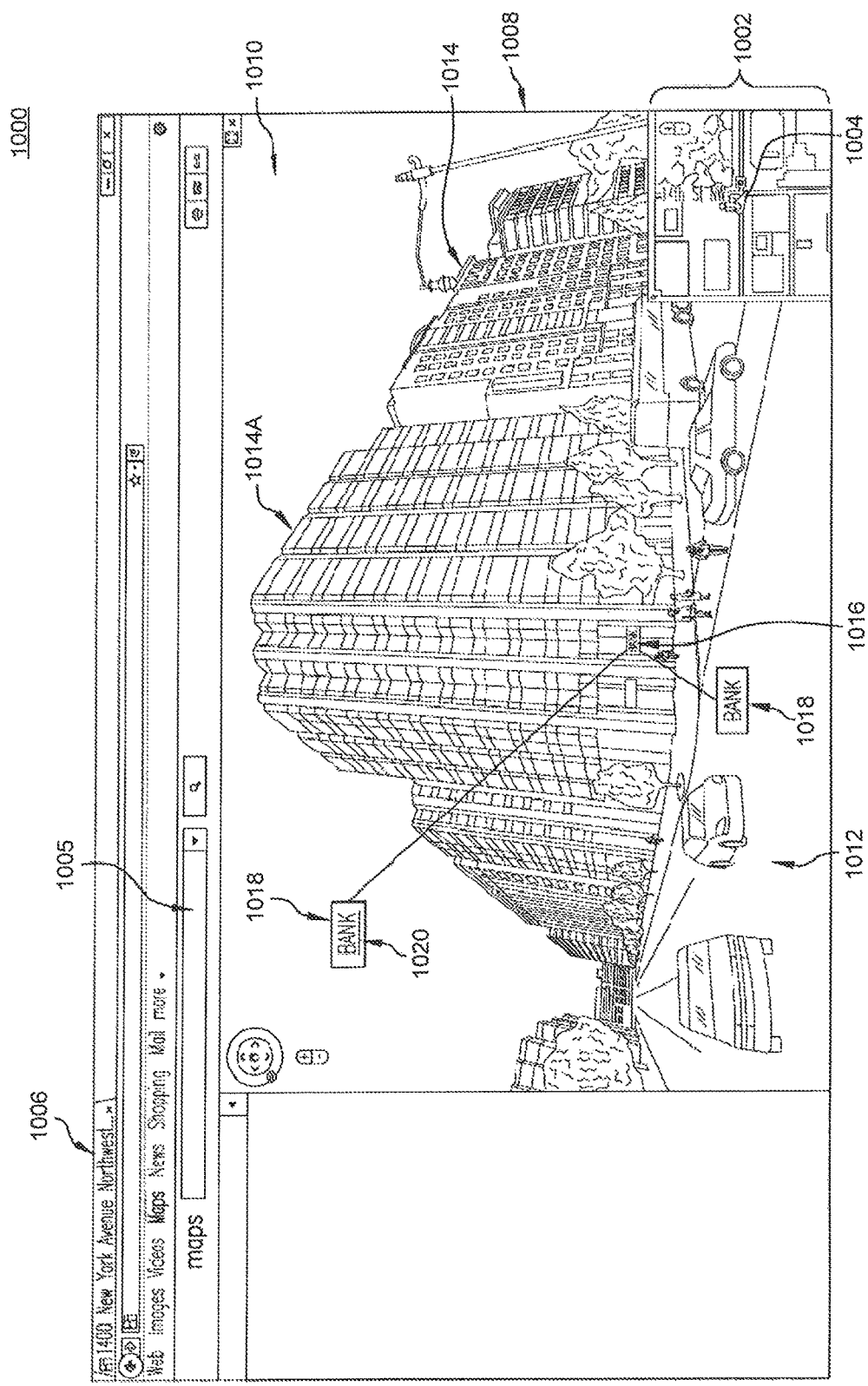
FIG. 10 is an exemplary embodiment of an image that includes labels.

FIG. 10 is an exemplary user interface 1000 that includes an image and labels. User interface 1000 includes image 614 of a city block 1008 that is presented to a user using street viewer 610. Street viewer 610 may also present a user with a map of a geographic location, such as map 1002. In one embodiment, map 1002 may be overlaid over a corner of image 614. Street viewer 610 uses a map pointer 1004 included in map 1002 to indicate the actual geographic location that corresponds to city block 1008.

User interface 1000 includes a search box 1005. Search box 1005 allows a user to enter an address of a geographic location for image 614 that may be presented to the user. Once the user enters the address of a geographic location, street viewer 610 uses the entered address to obtain the corresponding image 614 from image database 612. In one embodiment, street viewer 610 may display the user entered address using tab 1006.

City block 1008 presented as image 614 to a user may include multiple objects, such as a sky 1010, a road 1012, and multiple buildings 1014, to name only a few. Sky 1010, road 1012, and building 1014 are two-dimensional objects that object identifier 714 identifies from a three-dimensional model of image 614.

Buildings 1014 that correspond to city block 1008 may also include retail establishments, banks, etc., that require labels. For example, the ground floor of building 1014a includes a bank 1016. Unlike conventional systems where the label is overlaid directly on the image of the bank, or at a fixed offset from bank's location, city block 1008 includes labels, such as labels 1018 that are overlaid on objects that do not obstruct the image of bank 1016 or building 1014A. For example, in image 614 of city block 1008, labels 1018 are overlaid over sky 1010 or road 1012.

In one embodiment, label 1018 includes a name of bank 1016. In another embodiment, label 1018 may also include a link 1020. As described herein, link 1020 may be a link to a website that includes information about bank 1016, such as its operating hours, contact information, etc.

Figure 11:
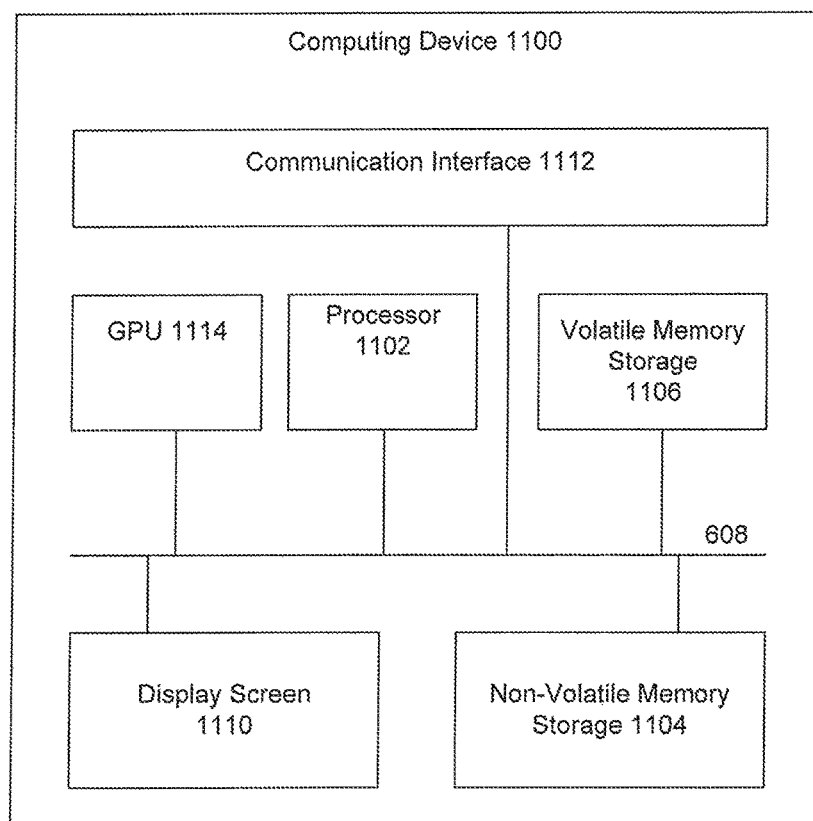
FIG. 11 is a block diagram of a computer system in which aspects of the technology can be implemented.

FIG. 11 is a block diagram of a computer system in which embodiments of the technology can be implemented. For example, the components or modules of system 600, such as object identifier 714, label annotator 716 and model generator 718 may be implemented in one or more computer systems 600 using hardware, software, firmware, tangible computer-readable media having instructions stored thereon, or a combination thereof and may be implemented in one or more computer systems or other processing systems. Modules and components in FIGS. 6-11 may be embodied in hardware, software, or any combination thereof.

Client 1104 or web server 1106 may include one or more computing devices. Client 1104 or web server 1106 may include one or more processors 1102, one or more non-volatile storage mediums 1104, one or more memory devices 1106, a communication infrastructure 1108, a display screen 1110 and a communication interface 1112. Processors 1102 may include any conventional or special purpose processor, including, but not limited to, digital signal processor (DSP), field programmable gate array (FPGA), and application specific integrated circuit (ASIC). Non-volatile storage 1104 may include one or more of a hard disk drive, flash memory, and like devices that may store computer program instructions and data on computer-readable media. One or more of non-volatile storage device 1104 may be a removable storage device. Memory devices 1106 may include one or more volatile memory devices such as but not limited to, random access memory. Communication infrastructure 1108 may include one or more device interconnection buses such as Ethernet, Peripheral Component Interconnect (PCI), and the like.

Typically, computer instructions are executed using one or more processors 1102 and can be stored in non-volatile storage medium 1104 or memory devices 1106.

Display screen 1110 allows results of the computer operations to be displayed to a user or an application developer.

Communication interface 1112 allows software and data to be transferred between computer system 1100 and external devices. Communication interface 1112 may include a modem, a network interface (such as an Ethernet card), a communications port, a PCMCIA slot and card, or the like. Software and data transferred via communication interface 1112 may be in the form of signals, which may be electronic, electromagnetic, optical, or other signals capable of being received by communication interface 1112. These signals may be provided to communication interface 1112 via a communications path. The communications path carries signals and may be implemented using wire or cable, fiber optics, a phone line, a cellular phone link, an RF link or other communications channels.

Embodiments of the technology also may be directed to computer program products including software stored on any computer readable storage medium. Such software, when executed in one or more data processing device, causes a data processing device(s) to operate as described herein. Embodiments of the technology employ any computer useable or readable storage medium. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments as contemplated by the inventor(s), and thus, are not intended to limit the present technology and the appended claims in any way.

The foregoing description of specific embodiments so fully reveal the general nature of the technology that others can, by applying knowledge within the skill of the art, readily modify and/or adapt for various applications such specific embodiments, without undue experimentation, without departing from the general concept of the present technology. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present technology should not be limited by any of the above-described exemplary embodiments.

The invention claimed is:

1. A computer-implemented method, comprising:
   identifying, by one or more computer processors, a geolocation in response to a user action associated with a client device;
   obtaining, by the one or more computer processors, a photographic image associated with the geolocation in response to the user action associated with the geolocation;
   analyzing, by the one or more computer processors according to a three dimensional (3D) model, the photographic image to identify at least first and second objects therein;
   determining, by the one or more computer processors, in accordance with model data of the 3D model, a first object type of the first object and a second object type of the second object, the second object type being different from the first object type;
   determining, by the one or more computer processors, that the first object is to be annotated with a label based on the first object type;
   analyzing, by the one or more computer processors, the photographic image to determine a position on the second object for placing the label so that the label does not obstruct the first object;
   placing, by the one or more computer processors, the label at the determined position of the second object; and
   providing, by the one or more computer processors, the photographic image with the placed label for display on the client device.

2. The computer-implemented method of claim 1, wherein determining the first and second object types includes:
   extracting locations of the first and second objects from the model data of the 3D model; and
   identifying the first and second object types according to the extracted locations of the first and second objects.

3. The computer-implemented method of claim 1, further comprising determining an area within the photographic image occupied by each of the first and second objects.

4. The computer-implemented method of claim 3, wherein determining the area within the photographic image occupied by each of the first and second objects includes matching the model data of the 3D model for each object to an area of a two dimensional image.

5. The computer-implemented method of claim 4, wherein pixels representing the first object in the two dimensional image are identified using corresponding pixels in a depth map associated with the 3D model.

6. The computer-implemented method of claim 1, further comprising determining that a label is not to be associated with the second object based on the second object type.

7. The computer-implemented method of claim 1, wherein the label includes a geocode identifying a geographic location of the first object.

8. The computer-implemented method of claim 1, wherein the label includes an input module configured to receive an action from a user.

9. The computer-implemented method of claim 1, wherein analyzing the photographic image includes evaluating data included within the photographic image, the data describing a scene captured in the photographic image.

10. The computer-implemented method of claim 9, wherein the data includes a distance value for one or more pixels in the photographic image.

11. The computer-implemented method of claim 10, wherein the distance value indicates a distance between an object captured in the photographic image and an image capture device that captured the photographic image.

12. The computer-implemented method of claim 1, wherein obtaining the photographic image includes retrieving a map indicating the geolocation thereon corresponding to the photographic image.

13. A system, comprising:
one or more computer processors configured to:
  identify a geolocation in response to a user action associated with a client device;
  obtain, from an image database, a photographic image associated with the geolocation in response to the user action associated with the geolocation;
  analyze, according to a three dimensional (3D) model, the photographic image to identify at least first and second objects therein;
  determine, in accordance with model data of the 3D model, a first object type of the first object and a second object type of the second object, the second object type being different from the first object type;
  determine that the first object is to be annotated with a label based on the first object type;
  analyze the photographic image to determine a position on the second object for placing the label so that the label does not obstruct the first object;
  place the label at the determined position of the second object; and
  provide the photographic image with the placed label for display on the client device.

14. The system of claim 13, wherein the one or more computer processors are configured to determine the first and second object types by:
  extracting locations of the first and second objects from the model data of the 3D model; and
  identifying the first and second object types according to the extracted locations of the first and second objects.

15. The system of claim 13, wherein the one or more computer processors are further configured to determine an area within the photographic image occupied by each of the first and second objects.

16. The system of claim 15, wherein the determination that the area within the photographic image occupied by each of the first and second objects includes matching the model data of the 3D model for each object to an area of a two dimensional image.

17. The system of claim 16, wherein pixels representing the first object in the two dimensional image are identified using corresponding pixels in a depth map associated with the 3D model.

18. The system of claim 13, wherein the one or more computer processors are further configured to determine that a label is not to be associated with the second object based on the second object type.

19. A non-transitory storage medium storing computer-readable instructions there, the instructions, when executed by one or more computer processors, performing a method comprising:
  identifying a geolocation in response to a user action associated with a client device;
  obtaining a photographic image associated with the geolocation, in response to the user action associated with the geolocation;
  analyzing, according to a three dimensional (3D) model, the photographic image to identify at least first and second objects therein;
  determining, in accordance with model data of the 3D model, a first object type of the first object and a second object type of the second object, the second object type being different from the first object type;
  determining that the first object is to be annotated with a label based on the first object type;
  analyzing the photographic image to determine a position on the second object for placing the label so that the label does not obstruct the first object;
  placing the label at the determined position of the second object; and
  providing the photographic image with the placed label for display on the client device.

20. The non-transitory storage medium of claim 19, wherein determining the first and second object types includes:
  extracting locations of the first and second objects from the model data of the 3D model; and
  identifying the first and second object types according to the extracted locations of the first and second objects.

* * * * *